(12) United States Patent
Rickenbach et al.

(10) Patent No.: US 9,469,258 B1
(45) Date of Patent: Oct. 18, 2016

(54) AIRBAG WIRE RETENTION FEATURE

(71) Applicant: Autoliv ASP, Incorporated, Ogden, UT (US)

(72) Inventors: Roger Rickenbach, Pleasant View, UT (US); Terry Wheelwright, Morgan, UT (US); Megan Donahue, North Salt Lake, UT (US); Don Parker, Layton, UT (US); Andrew Holiday, Ogden, UT (US)

(73) Assignee: Autoliv ASP, Incorporated, Ogden, UT (US)

( * ) Notice: Subject to any disclaimer, the term of this patent is extended or adjusted under 35 U.S.C. 154(b) by 0 days.

(21) Appl. No.: 14/813,062

(22) Filed: Jul. 29, 2015

(51) Int. Cl.
*B60R 21/20* (2011.01)
*B60R 16/02* (2006.01)

(52) U.S. Cl.
CPC ........... *B60R 16/0215* (2013.01); *B60R 21/20* (2013.01)

(58) Field of Classification Search
CPC .................... B60R 21/20; B60R 16/0215
See application file for complete search history.

(56) References Cited

U.S. PATENT DOCUMENTS

| | | | |
|---|---|---|---|
| 5,164,546 A * | 11/1992 | Kumagai | B60R 16/0215 174/135 |
| 8,469,392 B2 | 6/2013 | Shankar | |
| 2001/0052203 A1* | 12/2001 | Doshita | H02G 11/006 49/502 |
| 2003/0006057 A1* | 1/2003 | Ito | B60R 16/0215 174/68.3 |
| 2007/0266885 A1* | 11/2007 | Takimoto | B60R 16/0215 102/530 |
| 2013/0163931 A1* | 6/2013 | Enomoto | G02B 6/3858 385/60 |

* cited by examiner

*Primary Examiner* — Drew Brown
(74) *Attorney, Agent, or Firm* — Madson IP, P.C.

(57) ABSTRACT

A wire retention feature for an airbag module is provided where the airbag module has an inflator, a wire harness, and at least one of a cover, a wrapper, and a cushion. The wire retention feature has a tab extending from at least one of the cover, the wrapper, and the cushion, and a fastener securely attached to the wire harness. The fastener is securely connectable to the tab such that a pulling force being applied to the wire harness is distributed among the fastener, the tab, and at least one of the cover, the wrapper, and the cushion without negatively affecting the transmission of electrical signals through the wire harness to the inflator.

20 Claims, 8 Drawing Sheets

AIRBAG WIRE RETENTION FEATURE

BACKGROUND OF THE INVENTION

1. Field of the Invention

The present disclosure relates generally to inflatable airbag protection systems for motor vehicles. More specifically, various embodiments of the present disclosure relate to preventing electrical issues with wiring for mishandled airbag modules.

2. The Relevant Technology

Modern motor vehicles typically employ various occupant protection systems that self-actuate from an undeployed to a deployed state without the need for intervention by the occupant. Such systems often include an inflatable occupant protection system in the form of a cushion or bag, commonly referred to as an "airbag cushion," which is now a legal requirement for many new vehicles. Such airbag cushions are typically installed in various locations in a vehicle and may deploy into one or more locations within the vehicle between the occupant and certain parts of the vehicle interior, such as the doors, steering wheel, instrument panel, dashboard or the like, to prevent or cushion the occupant from forcibly striking such parts of the vehicle interior.

Various types or forms of occupant protection systems have been developed or tailored to provide desired vehicle occupant protection based on either or both the position or placement of the occupant within the vehicle and the direction or nature of the vehicle collision. For example, driver and passenger inflatable cushion installations have found wide usage for providing protection to drivers and front seat passengers, respectively, in the event of a head-on type of collision. Other installations, such as side inflatable cushion installations, have found wide usage for providing protection to vehicle occupants in the event of a side impact (e.g., side collision, roll-over).

The airbag cushion is conventionally housed in an uninflated and folded condition to minimize space requirements. In the event of an accident, an accelerometer within the vehicle measures the abnormal deceleration and triggers the expulsion of rapidly expanding gases supplied or produced by a device commonly referred to as an "inflator." The expanding gases fill the airbags, which immediately inflate in front of the driver and/or passenger to protect them from impact against a windshield, dashboard, or other surfaces of the vehicle interior.

The electrical signal employed to trigger the expulsion of the rapidly expanding gases can be carried by a conventional conductor, such as a lead wire or wire harness (in the interest of brevity, the term "wire harness" as used herein includes a lead wire within its meaning) that is connected to the inflator. In conventional occupant protection systems, such a wire harness can typically run within an airbag cover apparatus between the inflator and the folded airbag cushion. In some cases, the wire harness can become positioned along an attachment side of the occupant protection system. For example, during shipping, the wire harness can move around within the airbag cover apparatus between the inflator and the airbag cushion until it becomes located in the attachment area of the occupant protection system. When the wire harness moves in this manner, it can be pinched or otherwise compressed between, for example, the inflator and part of the motor vehicle to which the occupant protection system is installed (e.g., a seat frame, vehicle frame) as the occupant protection system is secured during installation.

Additionally, during shipping or installation, the airbag cover may be mishandled. Although it is considered mishandling, it is easier for a worker to carry several airbag modules in each hand by grasping several wire harnesses in each hand and dropping the heavy end of the airbag module while still holding onto the wiring. In instances where this is done with sufficient pulling force on the wire harness, the wire connection to the inflator may be compromised in a manner that will later negatively impact the transmission of the electrical signal needed to activate the inflator to deploy the airbag. It is also considered mishandling to excessively jerk on the wire harness during installation. Such mishandling may be accidental or may occur due to unnecessary rough handling in threading the wire harness through a conduit or tight spaces. If such mishandling occurs, electrical issues may result that may cause the deployment of the airbag to be faulty in some manner such as misfiring or delayed signal delivery.

Since occupant protection systems are important safety features in motor vehicles, it is critically important that they operate as intended, and are not damaged during shipping, handling or installation. It will be appreciated that when using presently available systems, the electrical intermittent issues can occur. Accordingly, a need exists for new features for preventing damage to the wiring due to mishandling. Exemplary features are disclosed herein.

BRIEF SUMMARY OF THE INVENTION

The exemplary embodiments of the present disclosure have been developed in response to the present state of the art, and in particular, in response to the problems and needs in the art that have not yet been fully solved by currently available airbag modules with wire harnesses.

The exemplary embodiments of the present disclosure provide a strain relief wire harness retention feature designed to eliminate any excessive forces transferred to an inflator squib pocket when dropping the airbag module while still holding onto the wire harness or by applying a jerking action to the wire harness. A wire retention feature is applied to either an airbag cushion, a cover, or an outer wrapper, and is designed to eliminate any excessive transferred tension forces from a drop or jerking action to the wire harness.

Exemplary embodiments of the wire retention feature comprise a plastic or fabric tab and a fastener. Such plastic or fabric tabs may provide a fastener-receiving feature and may facilitate load distribution characteristics. With several exemplary embodiments, the plastic or fabric tab may be attached to or integrally formed with the cover, wrapper, or cushion in a manner that the combination of the tab and the cover, wrapper, or cushion is strong enough to absorb the shock resulting from excessive transferred forces. The plastic or fabric tab may be fastened to a portion of the airbag module in any suitable manner, for example, by sewing, adhesive, clipping, being integrally formed with the cover, wrapper, or cushion, or any combination thereof.

A fastener may be attached securely to the wire harness for the airbag module. Connecting the fastener to the plastic or fabric tab in secure engagement provides a connection for transferring force from the wire harness of the airbag module through the fastener and plastic or fabric tab to the cover, wrapper, or cushion so that the force is distributed among each component of the wire retention feature to the cover, wrapper, or cushion.

These and other features of the present invention will become more fully apparent from the following description, or may be learned by the practice of the invention as set forth hereinafter.

BRIEF DESCRIPTION OF THE SEVERAL VIEWS OF THE DRAWINGS

In order that the manner in which the above-recited and other features and advantages of the exemplary embodiments of the invention are obtained will be readily understood, a more particular description of the invention briefly described above will be rendered by reference to specific embodiments thereof which are illustrated in the appended drawings. Understanding that these drawings depict only typical exemplary embodiments of the invention and are not therefore to be considered to be limiting of its scope, various exemplary embodiments will be described and explained with additional specificity and detail through the use of the accompanying drawings in which.

REFERENCE NUMBERS

Figure 1:
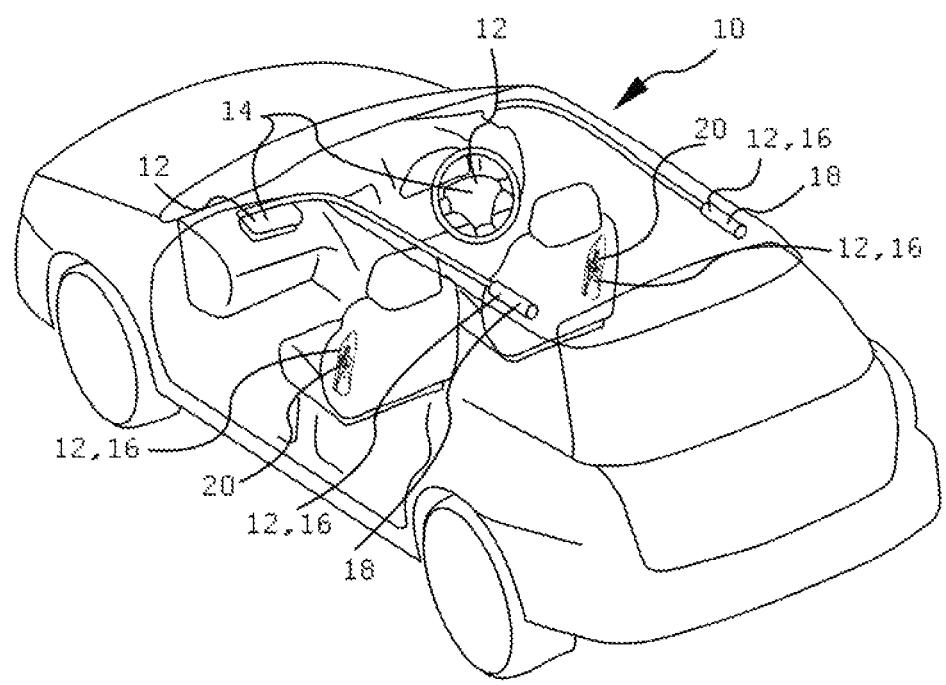
FIG. 1 is a perspective view of an exemplary vehicle showing various types of airbag protection devices and their locations within the vehicle, as is known in the art.

| | |
|---|---|
| motor vehicle 10 | inflatable airbag system 12 |
| driver/passenger airbag system 14 | side airbag system 16 |
| side curtain airbag module 18 | side torso airbag module 20 |
| seat 22 | wire harness 24 |
| cover 26 | seat frame 28 |
| inflator 30 | mounting studs 32 |
| inflatable cushion 34 | airbag module 100 |
| rigid cover 102 | wire retention feature 102 |
| tab 106 | fastener 108 |
| attachment portion 110 | fastener receiving feature 112 |
| securing portion 114 | capture portion 116 |
| fabric cover 118 | stitching 120 |
| eyelet 122 | arrowhead clip 124 |
| cover body 126 | inflator opening 128 |
| stud apertures 130 | perforated tear line 132 |
| inflator notch 134 | ears 136 |
| zip tie 138 | gear rack stop 140 |
| ratchet 142 | protruding element 144 |
| connection 146 | first fastener-receiving feature 148 |
| proximal end 150 | second fastener-receiving feature 152 |
| distal end 154 | reinforcement stitching 156 |

DETAILED DESCRIPTION OF THE INVENTION

The exemplary embodiments of the present disclosure will be best understood by reference to the drawings, wherein like parts are designated by like numerals throughout. It will be readily understood that the components of the various exemplary embodiments, as generally described and illustrated in the figures herein, could be arranged and designed in a wide variety of different configurations. Thus, the following more detailed description of the exemplary embodiments, as represented in the Figures, is not intended to limit the scope of the invention, as claimed, but is merely representative of exemplary embodiments of the invention.

While the various aspects of the embodiments are presented in drawings, the drawings are not necessarily drawn to scale unless specifically indicated. The illustrations presented herein are, in some instances, not actual views of any particular airbag cover apparatus or airbag module, but are merely idealized representations which are employed to describe various aspects of the present disclosure.

The word "exemplary" is used exclusively herein to mean "serving as an example, instance, or illustration." Any embodiment described herein as "exemplary" is not necessarily to be construed as preferred or advantageous over other embodiments.

In this application, the phrases "connected to", "coupled to", and "in communication with" refer to any form of interaction between two or more entities, including mechanical, capillary, electrical, magnetic, electromagnetic, pneumatic, hydraulic, fluidic, and thermal interactions.

The phrases "attached to", "secured to", and "mounted to" refer to a form of mechanical coupling that restricts relative translation or rotation between the attached, secured, or mounted objects, respectively. The phrase "slidably attached to" refer to a form of mechanical coupling that permits relative translation, respectively, while restricting other relative motions. The phrase "attached directly to" refers to a form of securement in which the secured items are in direct contact and retained in that state of securement.

The term "abutting" refers to items that are in direct physical contact with each other, although the items may not be attached together. The terms "grip" or "grasp" refers to items that are in direct physical contact with one of the items firmly holding the other. The term "integrally formed" refers to a body that is manufactured as a single piece, without requiring the assembly of constituent elements. Multiple elements may be integrally formed with each other, when attached directly to each other from a single work piece. Thus, elements that are "coupled to" each other may be formed together as a single piece.

Figure 2:
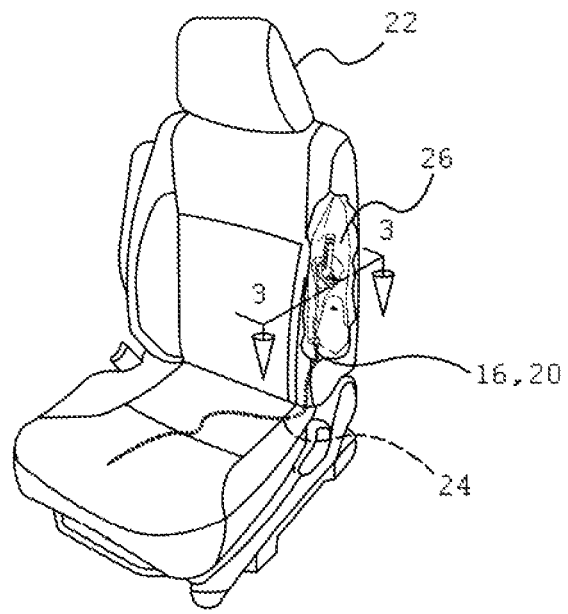
FIG. 2 is a partially cut-away perspective view of a driver's side seat, showing where a side airbag may be positioned within the seat, as is known in the art.
Figure 3:
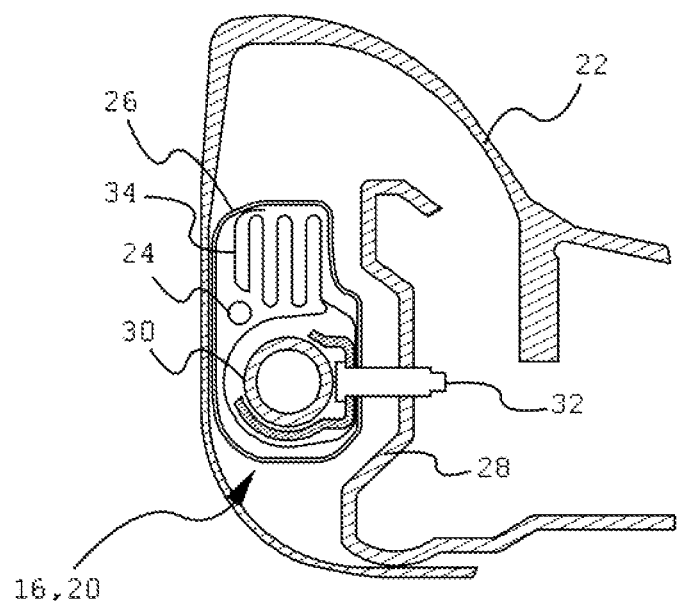
FIG. 3 is a sectional view of an exemplary driver's side seat along line 3-3 of FIG. 2, showing a side airbag module secured to the seat and an example of the components for such an airbag module, as is known in the art.

FIGS. 1-3 are representations of the environment within which the wire retention feature of the present disclosure ultimately operates. As shown, FIGS. 1-3 represent prior art depictions of that environment. FIGS. 1-3 are provided to give context to the disclosure.

Referring initially to FIG. 1, a motor vehicle 10 may include various inflatable airbag systems 12 installed throughout the interior thereof. For example, a motor vehicle 10 may include driver and passenger airbag systems 14 for providing protection to drivers and front seat passengers, respectively, in the event of head-on type of collisions. In addition, a motor vehicle 10 may include side airbag systems 16 for providing protection to vehicle occupants in the event of a side impact (e.g., side collision, roll-over). Such side airbag systems 16 may include side curtain airbag modules 18 and side torso airbag modules 20. Side curtain airbag modules 18 are typically installed along a side portion of the vehicle's interior. Side torso airbag modules 20 (also referred to as side thorax/abdomen airbag modules) are typically installed in the seats of the motor vehicle 10.

According to a feature of the present disclosure, side airbag modules 16 can include a cover apparatus that is adapted to route a wire harness (or lead wire) along a defined path that is away from an attachment side of the side airbag module 16.

Turning to FIG. 2, a seat 22 is shown that includes a side airbag module 16 configured as a side torso airbag module 20 disposed within the seat 22. As illustrated, a wire harness 24 may extend through a cover 26 of the side airbag module 16 in a manner to position the wire harness 24 away from an attachment side of the side airbag module 16.

FIG. 3 is a cross-sectioned view taken along line 3-3 in FIG. 2, showing the side airbag module 16 coupled to a portion of a seat frame 28. As shown in FIG. 3, the side airbag module 16 includes an inflator 30 that is coupled to the seat frame 28 by mounting studs 32. The side airbag module 16 further includes an inflatable cushion 34 in fluid communication with the inflator 30 so that the inflatable cushion 34 can be inflated by rapidly expanding gases supplied or produced by the inflator 30 upon deployment.

The cover 26 of the side airbag module 16 at least partially houses the inflator 30 and the inflatable cushion 34. The mounting studs 32 of the inflator 30 extend through the cover 26 so they can be coupled (e.g., bolted) to the seat frame 28. Accordingly, the cover 26 may include at least one stud aperture (e.g., stud apertures 130 shown in FIG. 6) through which the mounting studs 32 can extend. The cover 26 also includes passages adapted to route the wire harness 24 through at least a portion of the cover 26.

As shown in FIG. 3, the wire harness 24 is routed through at least a portion the cover 26 so that the wire harness 24 is positioned away from the attachment side of the side airbag module 16 (e.g., away from the mounting studs 32 of the inflator 30). In the example shown in FIG. 3, the wire harness 24 is routed inside the cover 26 between the cover 26 and the inflatable cushion 34, and is positioned substantially opposite from the attachment side of the side airbag module 16. With the wire harness 24 routed through the cover 26 at a position away from the attachment side of the side airbag module 16, the wire harness 24 will not be trapped or compressed between the side airbag module 16 and the seat frame 28 (e.g., between the inflator 30 and the seat frame 28).

It should be understood that, although this description utilizes an airbag module particularly suitable for use as a side torso airbag module, this disclosure is not limited to side torso airbag modules. Rather, those skilled in the art, armed with this disclosure, will know readily upon which types of airbag modules the wire retention features of this disclosure may be used advantageously. Hence, the descriptions used herein are limited for brevity and not intended to limit the invention unnecessarily.

Figure 4:
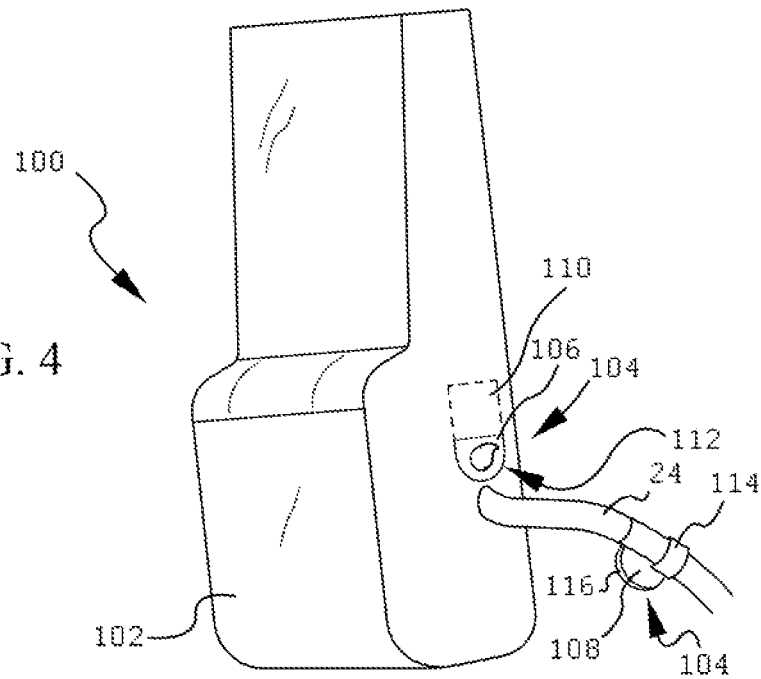
FIG. 4 is a perspective view of an exemplary airbag module having a rigid cover and showing an exemplary embodiment of the wire retention feature of the present disclosure.

Turning now to FIG. 4, a perspective view of an exemplary airbag module 100 with a rigid cover 102 is shown. The airbag module 100 of FIG. 4 has a rigid cover 102, a wire harness 24 and a wire retention feature, generally designated as 104. The wire retention feature 104 has a tab 106 and a fastener 108 that is connectable to the tab 106. As depicted, the tab 106 is secured to the rigid cover 104 and the fastener 108 is secured to the wire harness 24, but not yet connected the tab 106.

The rigid cover 102 houses an inflator 30 (not shown), a portion of the wire harness 24 (not shown) that connects to the inflator 30, and some type of connection feature (not shown) for securing the airbag module 100 to a particular location in a vehicle. As is apparent, the rigid cover 102 and its housed components (not shown) constitute the heavy portion of the airbag module 100, and would cause a strain on the connection (not shown; however, an exemplary connection 146 is shown in FIG. 11) of the wire harness 24 to the inflator 30 if it were dropped while retaining a hold on the wire harness 24, or if the wire harness 24 were tugged on excessively during installation of the airbag module 100 into a vehicle.

Figures 10, 11:
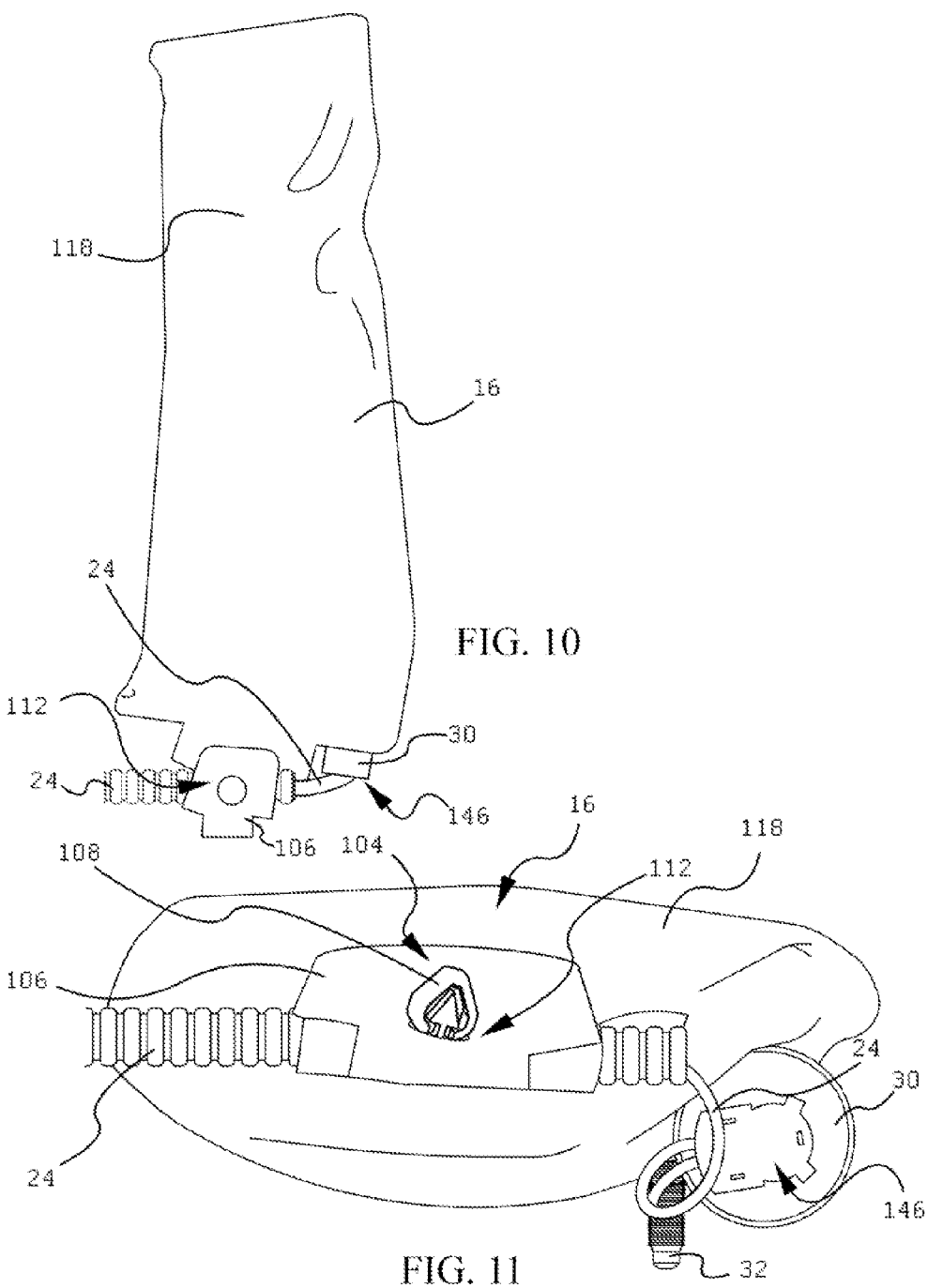
FIG. 10 is a plan view of an exemplary airbag module having a tab integrally formed therewith.
FIG. 11 is an end view of the airbag module of FIG. 10 showing an exemplary wire retention feature with the tab secured to a fastener to secure a wire harness.

By securing the fastener 108 to the tab 106, any pulling force on the wire harness 24 in a direction away from the rigid cover 104, typically due to mishandling, would be absorbed by the connected combination of the fastener 108, the tab 106, and the rigid cover 104, thus reducing or eliminating any possibility that the connection (not shown; however, an exemplary connection 146 is shown in FIG. 11) of the wire harness 24 to the inflator 30 may be compromised in a manner that will later negatively impact the transmission of the electrical signal needed to activate the inflator 30 to deploy the inflatable cushion 34.

The tab 106 may be attached to the rigid cover 102 of the airbag module 100 in any suitable manner, for example, by sewing, adhesive, clipping, being integrally formed with the cover, wrapper, or cushion, or any combination thereof. As shown in FIG. 4, tab 106 is a plastic tab with an attachment portion 110 and a fastener-receiving feature 112 where the attachment portion 110 is attached to the rigid cover 102 by an adhesive.

The fastener 108, as shown in FIG. 4, has a securing portion 114 and a capture portion 116 where the securing portion 114 is wrapped around the wire harness 24 to secure the fastener 108 to the wire harness 24 in a compressing engagement that grasps the wire harness 24 and the capture portion 116 is capable of capturing the fastener-receiving feature 112 in secure engagement.

The fastener 108 may have any configuration that accomplishes the secure attachment to the wire harness 24 and the connection to the tab 106 in a secure engagement. The depiction of the wire retention feature 104 in FIG. 4 is an idealized representation employed to facilitate the description of various aspects of the wire retention feature 104. Hence, the capture portion 116 and the fastener-receiving feature 112 are depicted as separate components of the wire retention feature 104 and can comprise any of numerous known retention devices, such as an alligator jaw clip and clip-receiving pad, an arrowhead clip and eyelet, a ball-stud speed clip, meltable post (meltable into a mushroom head) and eyelet, and any other suitable combination of components that effectively can secure the engagement of the capture portion 116 and the fastener-receiving feature 112. Similarly, the securing portion 114 of the fastener 108 can comprise any of numerous known compression devices, such as a hose clamp, a zip tie, a crimp hose clamp, and any other suitable compression securement.

Figure 5:
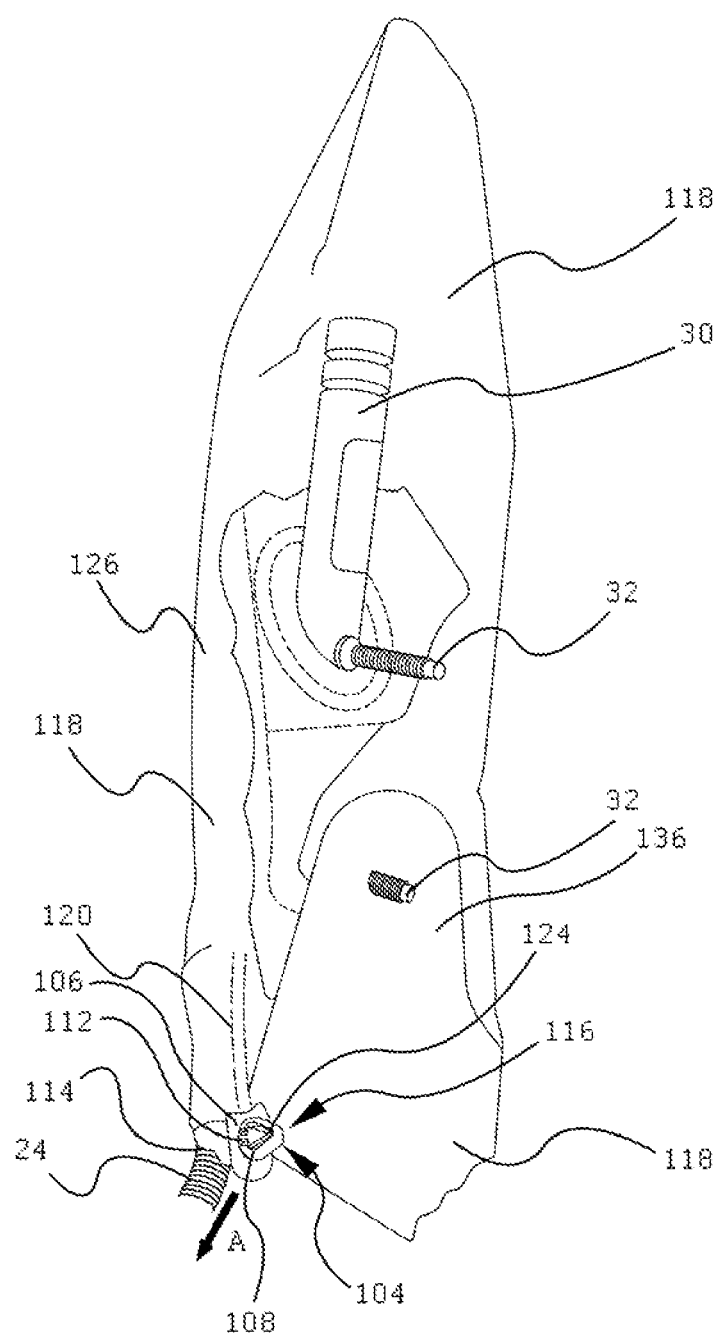
FIG. 5 is a plan view of another exemplary embodiment of the wire retention feature of the present disclosure as used with an airbag module with a fabric cover.

An exemplary embodiment of a side airbag system 16 that utilizes a wire retention feature 104 is illustrated in FIGS. 5-9. FIG. 5 shows the side airbag system 16 as fully assembled, while FIGS. 6-9 illustrate various component parts of the overall side airbag system 16 of FIG. 5. The wire retention feature 114 provides a significant advantage in reducing or eliminating electrical issues due to mishandling while occupying very little space and adding very little weight or cost to the side airbag system 16.

The side airbag system 16 of FIG. 5 comprises a wire harness 24 that connects to an inflator 30 that has mounting studs 32, an inflatable curtain 34 (not shown, see FIG. 3), a flexible cover 118, and a wire retention feature 104. The flexible cover 118 shown may be made of any suitable material that has sufficient flexibility to wrap around the inflator 30, the inflatable curtain 34, and a portion of the wire harness 24 proximate the connection (not shown; however, an exemplary connection 146 is shown in FIG. 11) with the inflator 30 and strong enough to help absorb the force resulting from an excessive pulling force on the wire harness 24. The material shown is a fabric that is lightweight and sturdy.

As shown, the flexible cover 118 could be characterized as a wrapper that merely wraps around the inflator 30, the compacted inflatable curtain 34 and possibly an internal cover (not shown) to hold them in a pre-deployment position. Wrappers are frequently used in this fashion and those skilled in the art, armed with this disclosure, will understand that a wire retention feature 104 can be applied to a wrapper in the same fashion as is illustrated in FIG. 5. Because a wrapper would look essentially the same as the flexible cover 118, for the sake of brevity, separate drawings showing a wrapper are not essential to the understanding of the invention and the understanding of those skilled in the art. Hence, for purposes of this disclosure, FIG. 5 is considered the same as a drawing of a wrapper with a wire retention feature 104.

As discussed above, a pulling force in the direction of arrow A due to mishandling, if unchecked, may compromise the connection (not shown; however, an exemplary connection 146 is shown in FIG. 11) of the wire harness 24 to the inflator 30 in a manner (e.g., causing a short in or actually dislodging the wire harness 24 from the connection with the inflator 30) that may later negatively impact the transmission of the electrical signal needed to activate the inflator 30 to deploy the inflatable cushion 34. The purpose of the wire retention feature 104 is to reduce or eliminate any possibility that the connection of the wire harness 24 to the inflator 30 may be compromised in a manner that will later negatively impact the transmission or the electrical signal needed to activate the inflator 30 to deploy the inflatable cushion 34.

The wire retention feature 104 shown in FIG. 5 comprises a tab 106 secured to the flexible cover 118 by stitching 120 and a fastener 108 secured to the wire harness 24. When the fastener 18 securely engages and holds the tab 106, much of the pulling force on the wire harness 24 is transferred to and is absorbed by or distributed among the fastener 108, the tab 106, and the flexible cover 118. Although the tab 106 and fastener 108 depicted may be made of materials different than what is shown, tab 106 and fastener 108 are made of plastic. Tab 106 has an attachment portion 110 (see FIG. 7) that is secured to the flexible cover 118 by stitching 120 and has a fastener-receiving feature 112. In this case, the fastener-receiving feature is an eyelet 122 (see FIG. 7). The fastener 108 has a securing portion 114 that secures the fastener 108 to the wire harness 24 in compressing engagement and a capture portion 116 that securely captures the tab 106. In this case, the capture portion 114 has an arrowhead clip 124 (see FIGS. 8 and 9) that passes through the eyelet 122 to effect the secure attachment of the tab 106 to the fastener 108.

Figure 6:
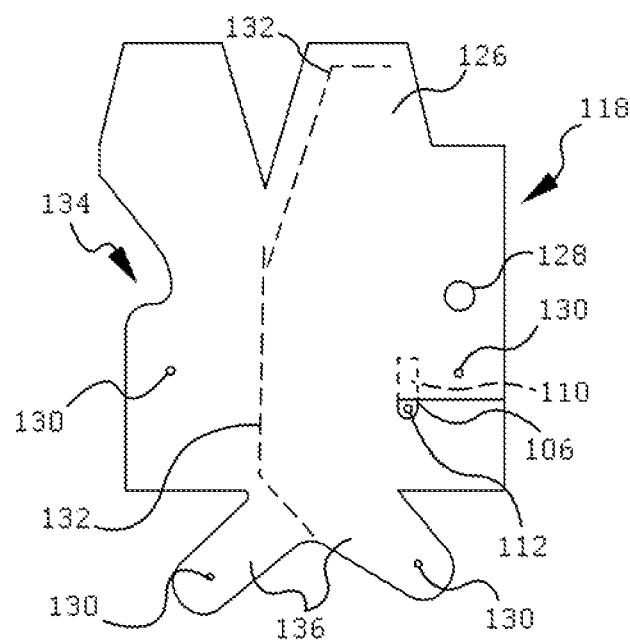
FIG. 6 is a flat pattern view of an exemplary cover for an airbag module as shown in FIG. 5, and showing the disposition of a tab utilized in the embodiment shown in FIG. 5.

FIG. 6 depicts the flexible cover 118 of FIG. 5 in a flat pattern view. This exemplary flexible cover 118 comprises a cover body 126 with an inflator opening 128, stud apertures 130, a perforated tear line 132 (shown in dashed lines), and a periphery with an inflator notch 134 and ears 136. Tab 106 is positioned on and attached to the flexible cover 118 where the fastener 108 can capture the tab 106 in manner that effectively permits force transfer from the wire harness 24 through the fastener 108 and the tab 106 to the flexible cover 118. As assembled (best seen in FIG. 5), the flexible cover 118 is wrapped around the inflator 30 and the inflatable curtain 34 and the ears 136 are folded upward so that the stud apertures 130 align for a mounting stud 32 can protrude through the layered aperture formed. With this configuration, the wire harness 24 extends out the bottom of the cover body 126 (see FIG. 5) and the inflatable curtain 34 will push through the perforated tear line 132 to deploy as it inflates when the inflator 30 provides inflation gas.

Figure 7:
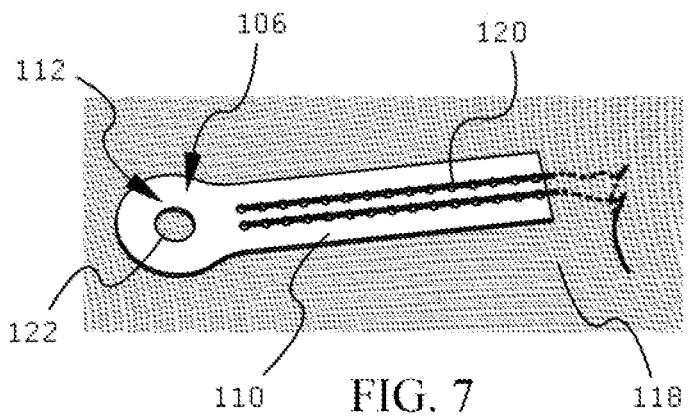
FIG. 7 is an enlarged view of an exemplary tab as secured to a cover, wrapper, or cushion.

A portion of the underside of the flexible cover 118 with tab 106 sewn in place using stitching 120 is shown in FIG. 7. The stitching 120 secures the attachment portion 110 of tab 106 to the flexible cover 118 while the fastener-receiving feature 112 of tab 106 extends from the flexible cover 118. In this instance, the fastener-receiving feature 112 comprises and eyelet 122 for accepting the fastener 108 in secure engagement.

Figure 8:
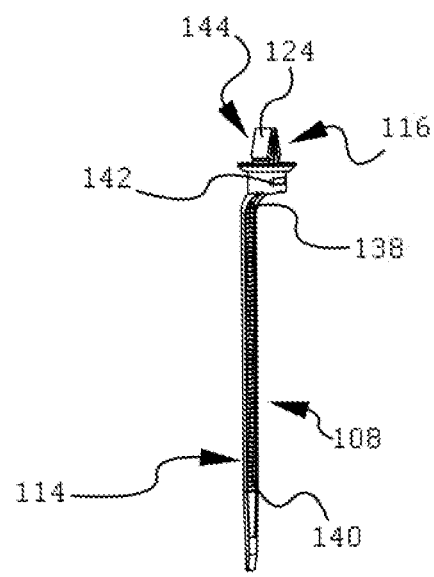
FIG. 8 is an enlarged view of an exemplary fastener having a zip-tie portion and an arrowhead clip portion that can be used as a component of an exemplary wire retention feature.

FIG. 8 is a perspective view of an exemplary fastener 108 that has a securing portion 114 and a capture portion 116. The securing portion 114 for this exemplary embodiment of the fastener 108 comprises a zip-tie 138 having a gear rack strap 140 and a ratchet 142 and may be made of any suitable material such as, for example, stainless steel (either naked or coated) or plastic. The capture portion 116 for this exemplary embodiment of the fastener 108 comprises a protruding element 144, and may be made of any suitable material. The protruding element 144, as shown, is an arrowhead clip 124; however, it should be understood that the protruding element 144 may be part of any suitable connecting element that securely engages the fastener-receiving feature 112 of tab 106. For example, those skilled in the art, armed with this disclosure, would understand that many combinations of fasteners 108 and fastener-receiving features 112 may be used, including but not limited to, an alligator jaw clip where the fastener-receiving feature is a clip-receiving pad, an arrowhead clip 124 (as shown in FIG. 8) and eyelet 122 (see FIG. 7), a ball-stud speed fastener, a meltable post and eyelet (such as disclosed in U.S. Pat. No. 8,459,713 and incorporated herein by this reference wherein the post is meltable into a mushroom head that captures the tab).

Figure 9:
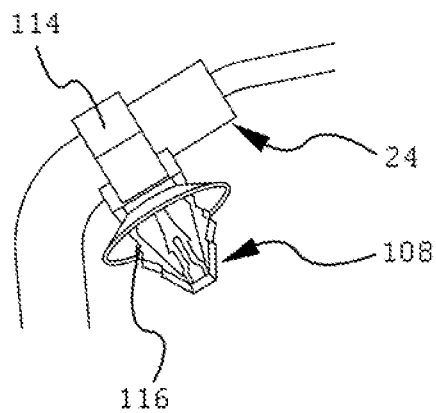
FIG. 9 is a schematic view showing a fastener as secured to a wire harness.

FIG. 9 shows the fastener 108 as attached securely to the wire harness 24 by using a compression engagement of the securing portion 114 of the fastener. As shown, the capture portion 116 is ready for capturing the fastener-receiving feature 112 of tab 106 (not shown in FIG. 9, see FIG. 7).

Referring now to FIGS. 10 and 11, the exemplary embodiment of the side airbag module 16 shown has a flexible cover 118 wherein tab 106 is integrally formed with the flexible cover 118. Integrally formed tab 106 does not have an attachment portion 110, but has a fastener-receiving feature 112. As shown in FIG. 10, the integrally formed tab 106 is an integral part of the bottom of flexible cover 118 and extends outward from the flexible cover 118 to facilitate a secure connection with fastener 108.

FIG. 11 shows an end view of the side airbag module 16 with the wire harness 24 surrounded by tab 106 and the fastener 108 protruding through the fastener-receiving feature 112 to engage the tab 106 in a secure engagement while the securing portion 114 (obscured from view by tab 106) of the fastener 108 is securely attached to the wire harness 24. FIG. 11 also provides an exemplary view of the connection 146 of the wire harness 24 to inflator 30. Without the force transfer characteristics provided by the wire retention feature 104, connection 146 would be vulnerable to damage due to mishandling of the side airbag module 16, as has been discussed above.

FIGS. 12A-D are a series of perspective views of an exemplary wrap-around wire retention feature 104 showing the steps for securing the wire harness 24 to a wrapper or flexible cover 118. This wire retention feature 104 differs slightly from previously disclosed configurations of the wire retention feature 104 in that it has a plurality of fastener-receiving features 112, it wraps around the wire harness 24 to align the plurality of fastener-receiving features 112, and it shields the securing portion 114 (not shown) of the fastener 108 against damage or tampering.

Figure 12A:
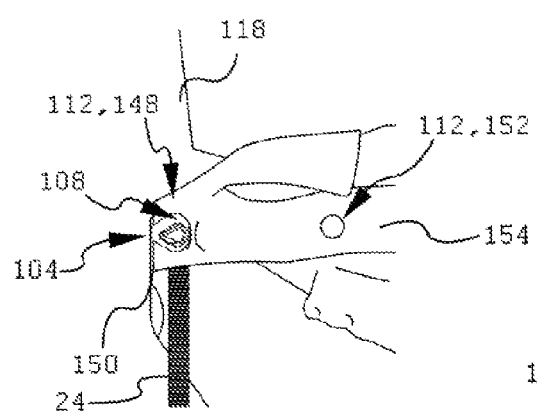
FIGS. 12A-D are a series of perspective views of an exemplary wrap-around wire retention feature showing the steps for securing the wire harness.

FIG. 12A shows the tab 106 as integrally formed with a wrapper or a flexible cover 118 and has a first fastener-receiving feature 148 at a proximal end 150 of the tab 106 already secured to the fastener 108 and a second fastener-receiving feature 152 at a distal end 154 of the tab 106 which is unsecured.

Figure 12B:
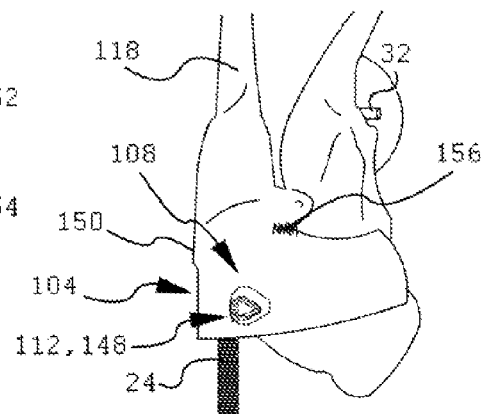

FIG. 12B is a slightly rotated view of the wrapper or flexible cover 118 showing reinforcement stitching 156 where the integrally formed tab 106 separates from the wrapper or flexible cover 118 to prevent the tab 106 from tearing away when a pulling force is applied to the wire harness 24.

Figure 12C:
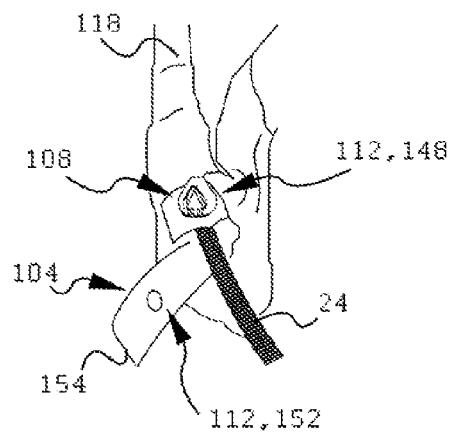

The distal end 154 of tab 106 may be wrapped around the wire harness 24, as shown in FIG. 12C, to shield the securing portion 114 (obscured from view by tab 106).

Figure 12D:
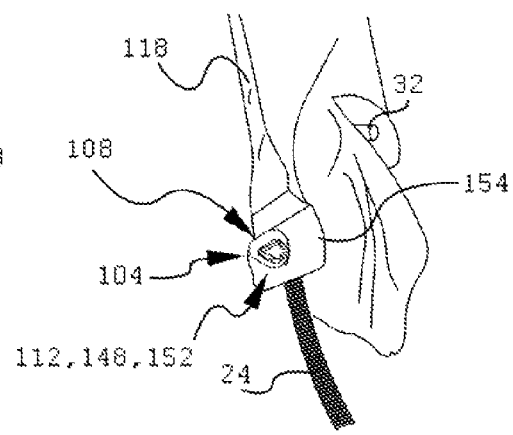

Finally, the distal end 154 of tab 106 is pulled across the fastener 108 until the second fastener-receiving feature 152 aligns with the capture portion 116 of the fastener 108 and may be pushed into secure engagement the fastener 108, as shown in FIG. 12D. With this embodiment, the tab 106 becomes doubly involved in the transfer of force from the wire harness 24 to the fastener 108, the tab 108, and the wrapper or flexible cover 118.

Figure 13:
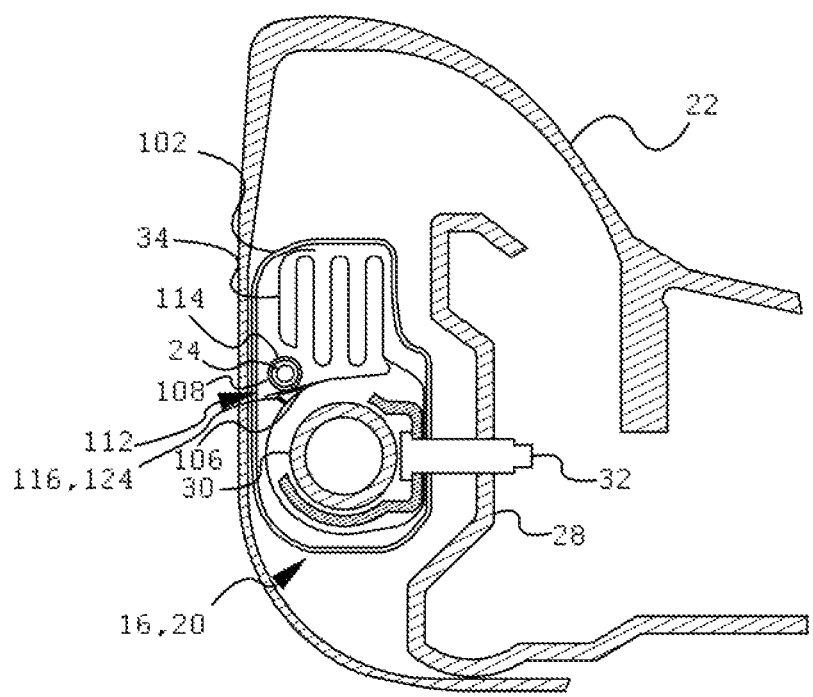
FIG. 13 is a sectional view of another exemplary embodiment of the wire retention feature showing a tab secured to an airbag cushion.

Another exemplary embodiment of a side airbag system 16 is shown in a sectional view in FIG. 13. With this exemplary embodiment, the tab 106 is attached to the inflatable cushion 34 inside a rigid cover 102. Hence, the wire retention feature 104, comprising both the tab 106 and the fastener 108, is disposed inside the rigid cover 102. As shown, the securing portion 114 of fastener 108 surrounds the wire harness 24 in compressing engagement while the capture portion 116, including an arrowhead clip 124, of fastener 108 securely engages the fastener-receiving feature 112 of tab 106. In this fashion, the wire retention feature 104 reduces or eliminates any possibility that the connection 146 (not shown) of the wire harness 24 to the inflator 30 may be compromised in a manner that will later negatively impact the transmission signal needed to activate the inflator 30 to deploy the inflatable cushion 34.

Although the tab 106 may be attached to the inflatable curtain 34 in many different locations than shown, those skilled in the art would understand that the location for the tab 106 should be such that the wire retention feature 104 will secure and protect the wire harness 24 from excessive pulling force and not damage the inflatable curtain 34 or interfere with the deployment of the inflatable curtain 34.

While specific exemplary embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A wire retention feature for an airbag module, the airbag module having an inflator, a wire harness, and at least one of a cover, a wrapper, and a cushion, the wire retention feature comprising:
   a tab extending from at least one of the cover, the wrapper, and the cushion; and
   a fastener securely attached to the wire harness, the fastener being securely connectable to the tab such that a pulling force being applied to the wire harness is distributed among the fastener, the tab, and at least one of the cover, the wrapper, and the cushion without negatively affecting the transmission of electrical signals through the wire harness to the airbag inflator.

2. A wire retention feature as in claim 1 wherein the tab comprises at least one fastener-receiving feature for engaging the fastener in secure engagement.

3. A wire retention feature as in claim 2 wherein the at least one fastener-receiving feature is an eyelet.

4. A wire retention feature as in claim 3 wherein the at least one fastener-receiving feature comprises a plurality of eyelets.

5. A wire retention feature as in claim 1 wherein at least a portion of the tab is plastic.

6. A wire retention feature as in claim 5 wherein at least a portion of the tab is attached to at least one of the cover, the wrapper, and the cushion.

7. A wire retention feature as in claim 6 wherein at least a portion of the tab is attached by stitching to at least one of the cover, the wrapper, and the cushion.

8. A wire retention feature as in claim 1 wherein at least a portion of the tab is integrally formed with at least one of the cover, the wrapper, and the cushion.

9. A wire retention feature as in claim 8 wherein the at least a portion of the tab comprises a fabric.

10. A wire retention feature as in claim 1 wherein the fastener has a securing portion and a capture portion, the securing portion of the fastener being securely attached to the wire harness and the capture portion being securely connectable to the tab.

11. A wire retention feature as in claim 10 wherein the securing portion comprises a zip-tie feature for securely attaching to the wire harness in a compressing engagement.

12. A wire retention feature as in claim 10 wherein the tab comprises at least one fastener-receiving feature for engaging the fastener in secure engagement, the capture portion having a protruding element that engages at least one fastener-receiving feature.

13. A wire retention feature as in claim 12 wherein the protruding element comprises one of a post and an arrowhead clip.

14. A wire retention feature as in claim 13 wherein the protruding element is a post and the post is meltable into a mushroom head that captures the tab in secure engagement.

15. A wire retention feature for an airbag module, the airbag module having an inflator, a wire harness, and at least one of a cover, a wrapper, and a cushion, the wire retention feature comprising:
- a tab extending from at least one of the cover, the wrapper, and the cushion, the tab comprising at least one fastener-receiving feature; and
- a fastener having a securing portion and a capture portion, the securing portion of the fastener being securely attached to the wire harness and the capture portion being securely connectable to the at least one fastener-receiving feature of the tab such that a pulling force being applied to the wire harness is distributed among the fastener, the tab, and at least one of the cover, the wrapper, and the cushion without negatively affecting the transmission of electrical signals through the wire harness to the airbag inflator.

16. A wire retention feature as in claim 15 wherein the securing portion comprises a zip-tie feature for securely attaching to the wire harness in a compressing engagement.

17. A wire retention feature as in claim 15 wherein the tab the capture portion comprises a protruding element that engages at least one fastener-receiving feature.

18. A method of wire retention for an airbag module, the airbag module having an inflator, a wire harness, and at least one of a cover, a wrapper, and a cushion, the method comprising the steps of:
- providing a tab that extends from at least one of the cover, the wrapper, and the cushion engagement;
- securely attaching a fastener having a securing portion and a capture portion to the wire harness, the securing portion of the fastener being securely attached to the wire harness; and
- securely connecting the capture portion of the fastener to the tab such that a pulling force being applied to the wire harness is distributed among the fastener, the tab, and at least one of the cover, the wrapper, and the cushion without negatively affecting the transmission of electrical signals through the wire harness to the inflator.

19. A method of wire retention as in claim 18 wherein the securing portion comprises a zip-tie feature for securely attaching to the wire harness in a compressing engagement.

20. A wire retention feature as in claim 18 wherein the tab comprises at least one fastener-receiving feature for engaging the fastener in secure engagement, the capture portion having a protruding element that engages at least one fastener-receiving feature.

* * * * *